United States Patent
Roeth et al.

(10) Patent No.: US 7,330,306 B2
(45) Date of Patent: *Feb. 12, 2008

(54) INTERCHANGEABLE MICROSCOPE STAGE DRIVE ASSEMBLY

(75) Inventors: Jasna Roeth, Solms (DE); Scott W. Parks, E. Amherst, NY (US); Russell Bonaventura, Williamsville, NY (US)

(73) Assignee: Leica Microsystems CMS GmbH, Wetzlar (DE)

( * ) Notice: Subject to any disclaimer, the term of this patent is extended or adjusted under 35 U.S.C. 154(b) by 136 days.

This patent is subject to a terminal disclaimer.

(21) Appl. No.: 10/810,773

(22) Filed: Mar. 26, 2004

(65) Prior Publication Data

US 2005/0111095 A1    May 26, 2005

Related U.S. Application Data

(63) Continuation-in-part of application No. 10/721,695, filed on Nov. 25, 2003, and a continuation-in-part of application No. 10/733,628, filed on Dec. 11, 2003.

(51) Int. Cl.
    *G02B 21/26* (2006.01)
(52) U.S. Cl. ...................... 359/391; 359/393
(58) Field of Classification Search ............. 359/391, 359/392, 393, 394
    See application file for complete search history.

(56) References Cited

U.S. PATENT DOCUMENTS

| | | | | |
|---|---|---|---|---|
| 2,500,604 A | * | 3/1950 | Daniel | 359/391 |
| 3,428,387 A | * | 2/1969 | Chambers et al. | 359/393 |
| 3,572,888 A | * | 3/1971 | Kawashima | 359/393 |
| 4,097,116 A | * | 6/1978 | Kuroha | 359/393 |
| 4,402,576 A | * | 9/1983 | Stahl et al. | 359/393 |
| 4,619,503 A | | 10/1986 | Reinheimer et al. | 359/372 |
| 5,552,321 A | | 9/1996 | Focht | 435/286.1 |
| 5,802,925 A | * | 9/1998 | Kanao | 74/490.13 |
| 6,018,415 A | | 1/2000 | Woo et al. | 359/393 |
| 6,369,940 B1 | * | 4/2002 | Nishida et al. | 359/393 |
| 2003/0169492 A1 | | 9/2003 | Nishida et al. | 359/393 |
| 2005/0111093 A1 | * | 5/2005 | Bonaventura et al. | 359/391 |

FOREIGN PATENT DOCUMENTS

| | | | |
|---|---|---|---|
| DE | 3521047 C1 | | 9/1986 |
| JP | 2002182122 | | 6/2002 |
| JP | 2002182122 A | * | 6/2002 |
| JP | 2004294497 A | * | 10/2004 |

OTHER PUBLICATIONS

Leitz Service. "Ergolux B 0 1—Ersatzteilliste", Ernst Leitz Wetzlar GmbH, Jun. 14, 1982.
Leica Service. "Leica FTM-20", 1995.
Leica Service. "Leitz Secolux 6×6," Ernst Leitz Wetzlar GmbH, 1982.

* cited by examiner

*Primary Examiner*—Arnel Lavarias
(74) *Attorney, Agent, or Firm*—Simpson & Simpson, PLLC

(57) ABSTRACT

An interchangeable microscope stage drive assembly, including a microscope stage, and, a drive mechanism detachably secured to the microscope stage at more than one location of the stage.

12 Claims, 9 Drawing Sheets

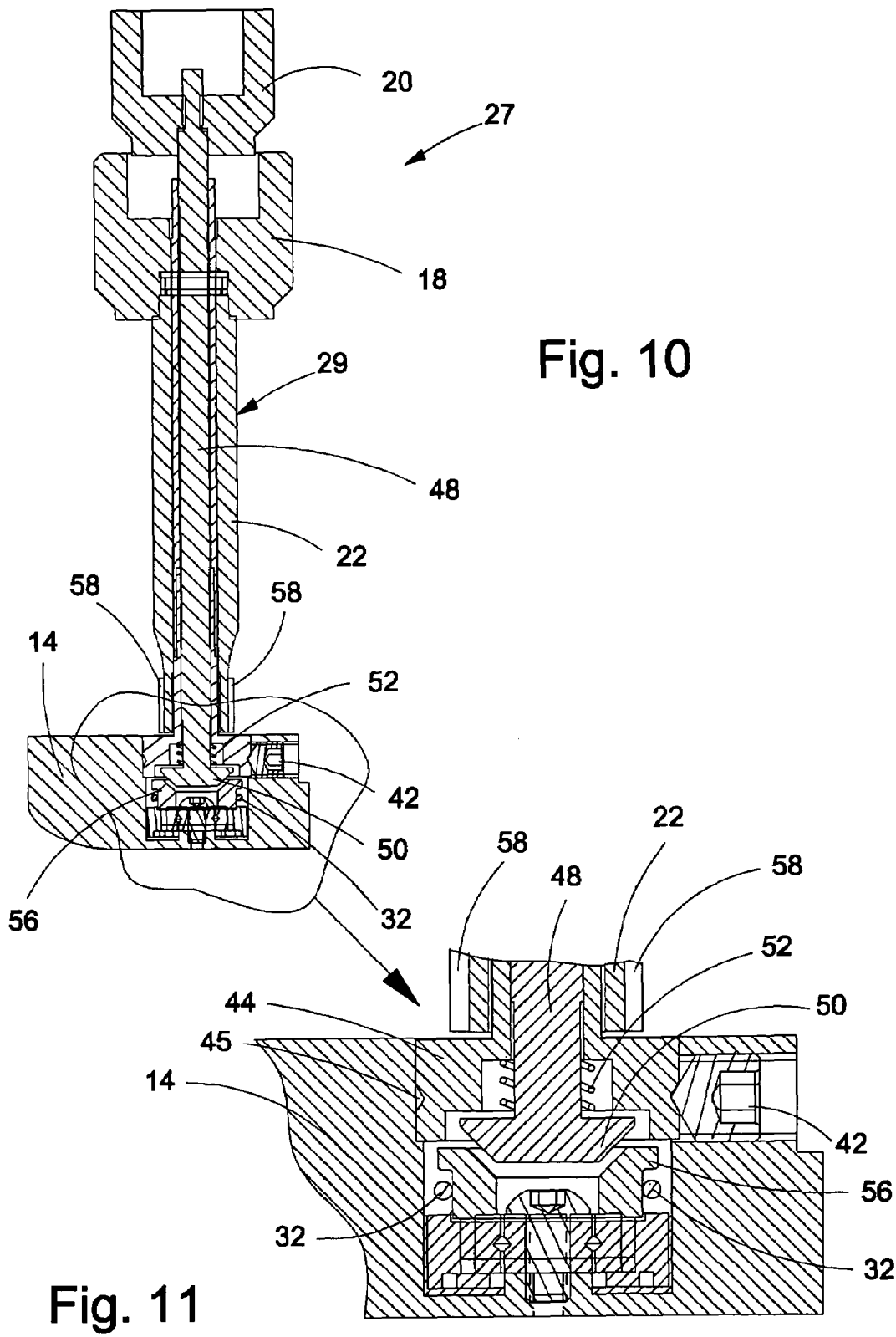

INTERCHANGEABLE MICROSCOPE STAGE DRIVE ASSEMBLY

CROSS REFERENCE TO RELATED APPLICATIONS

This application for patent is a Continuation-in-Part of U.S. patent applications No. 10/721,695, filed Nov. 25, 2003 and 10/733,628, filed Dec. 11, 2003.

FIELD OF THE INVENTION

The present invention relates generally to microscopy, more specifically to a mechanism for controlling stage movement of a microscope, and, even more particularly, to an interchangeable microscope stage drive assembly.

BACKGROUND OF THE INVENTION

As is well known, a microscope is an optical instrument used to view, examine and study very small objects. There are many different types of microscopes, each best suited to particular applications. These include compound microscopes, stereomicroscopes, confocal microscopes, inverted microscopes, and laser microscopes, to name but a few.

The present invention relates generally to compound microscopes and to those microscopes that are equipped with a sample stage capable of being controlled by a stage drive mechanism.

Microscopes have long used stages for the positioning of samples within the optical path. An object can be manipulated by moving the stage forwards and backwards, left and right, and up and down. A common convention for naming the left-right, front-back, and up-down axes is x, y, and z, respectively.

Often, the focusing mechanism functions by adjusting the stage height. By changing the sample height, the microscopist can observe different depths within the z-axis of the sample.

In order to adjust the x or the y position, the user must have available a stage control mechanism capable of performing this movement. Typically, both x and y adjustment are performed by a single mechanism. Additionally, this mechanism is located under and to one side of the stage.

Due to the variety of microscopists using these instruments, both left & right-handed stages are required. The location of the stage control mechanism is on the side of the stage matching the user's predominant hand of use. Further complicating the problem, a laboratory may have a left-handed and a right-handed user sharing a single microscope.

Having to match the stage configuration to the microscopist's predominate hand creates difficulty for the manufacture of product. Each microscope must be either a left-handed or a right-handed microscope. After the assembly is complete, changing the configuration requires significant disassembly and reassembly time, as well as requiring a complete additional stage mechanism. This problem also requires microscope manufacturers to maintain inventories of both left-handed and right-handed stage assemblies.

Further, at times it would be convenient for a microscopist to manipulate the microscope stage without the restrictions imposed by a stage control mechanism. For example, approximately 90% of pathologists use a "hand-drive" technique, i.e., rapid movement of the specimen by directly moving the slide mount without the use of the stage drive mechanism. Current systems are difficult for an operator to push or pull on the stage/slide mount, without potentially causing damage to the drive mechanisms. Furthermore, most pathologists would prefer to remove the stage drive mechanism completely. Thus, there has been a long-felt need for an interchangeable or easily removable microscope stage drive assembly.

BRIEF SUMMARY OF THE INVENTION

The present invention broadly comprises an interchangeable microscope stage drive assembly, including a microscope stage, and, a drive mechanism detachably secured to the microscope stage at more than one location of the stage.

A general object of the invention is to provide a drive means for movement of a microscope specimen that can be easily and quickly interchanged for use by right-handed and left-handed people.

Another object of the invention is to provide an interchangeable drive assembly for a microscope stage comprising a friction clutch, having the ability to slip, for the transfer of driving force from stage positioning knobs to the stage. The friction clutch comprises a plunger head and a driving pulley. The plunger head and driving pulley are arranged to matingly engage one another.

These and other objects, features and advantages of the present invention will become readily apparent to those having ordinary skill in the art upon reading the detailed description of the invention in view of the drawings and appended claims.

BRIEF DESCRIPTION OF THE DRAWINGS

The nature and mode of operation of the present invention will now be more fully described in the following detailed description of the invention taken with the accompanying drawing figures, in which:

FIG. 10 is a cross-sectional view of the interchangeable microscope stage drive assembly of the present invention, taken generally along line 10-10 of FIG. 8;

FIG. 11 is a magnified view of the encircled region of the invention shown in FIG. 10;

DETAILED DESCRIPTION OF THE INVENTION

It should be appreciated at the outset that while the present invention relates to an "Interchangeable Microscope Stage Drive Assembly", the Assignees of the present Application for Patent have developed certain other improvements to microscopes described in U.S. patent application Ser. No. 10/811,346, entitled "Releasable/Interchangeable Fine Focus Knob for a Microscope", U.S. patent application Ser. No. 10/811,344, entitled "Ergonomically Arranged Object Adjustment Controls", U.S. patent application Ser. No. 10/810,979, entitled "Shielded-Ergonomic Microscope Stages", U.S. patent application Ser. No. 10/810,980, entitled "Lamp Assembly for a Microscope" and U.S. patent application Ser. No. 10/811,348, entitled "Means for Transporting a Microscope", which applications are filed concurrently herewith by the Assignees of the present Application for Patent, which Applications are incorporated herewith by reference in their entireties.

Additionally, it should be appreciated that like drawing numbers on different drawing views identify identical structural elements of the invention. While the present invention is described with respect to what is presently considered to be the preferred embodiments, it is understood that the invention as claimed is not limited to the disclosed embodiments. In the description below, the terms "up", "down", "forward", "backward", "left", "right", and their derivatives, should be interpreted from the perspective of one viewing the microscope shown in FIG. 1.

The present invention broadly comprises a microscope assembly including a microscope stage and an interchangeable stage drive mechanism. In the embodiment shown in FIG. 1, the stage is adapted to receive the interchangeable drive mechanism. The interchangeable drive mechanism can be operatively arranged in several unique locations within the stage. A conventional compound microscope is shown in perspective view in FIG. 1. Although the invention is suitable for use with a variety of light microscopes, it is useful to review the basic microscope structure and function to appreciate the present invention.

Figure 1:
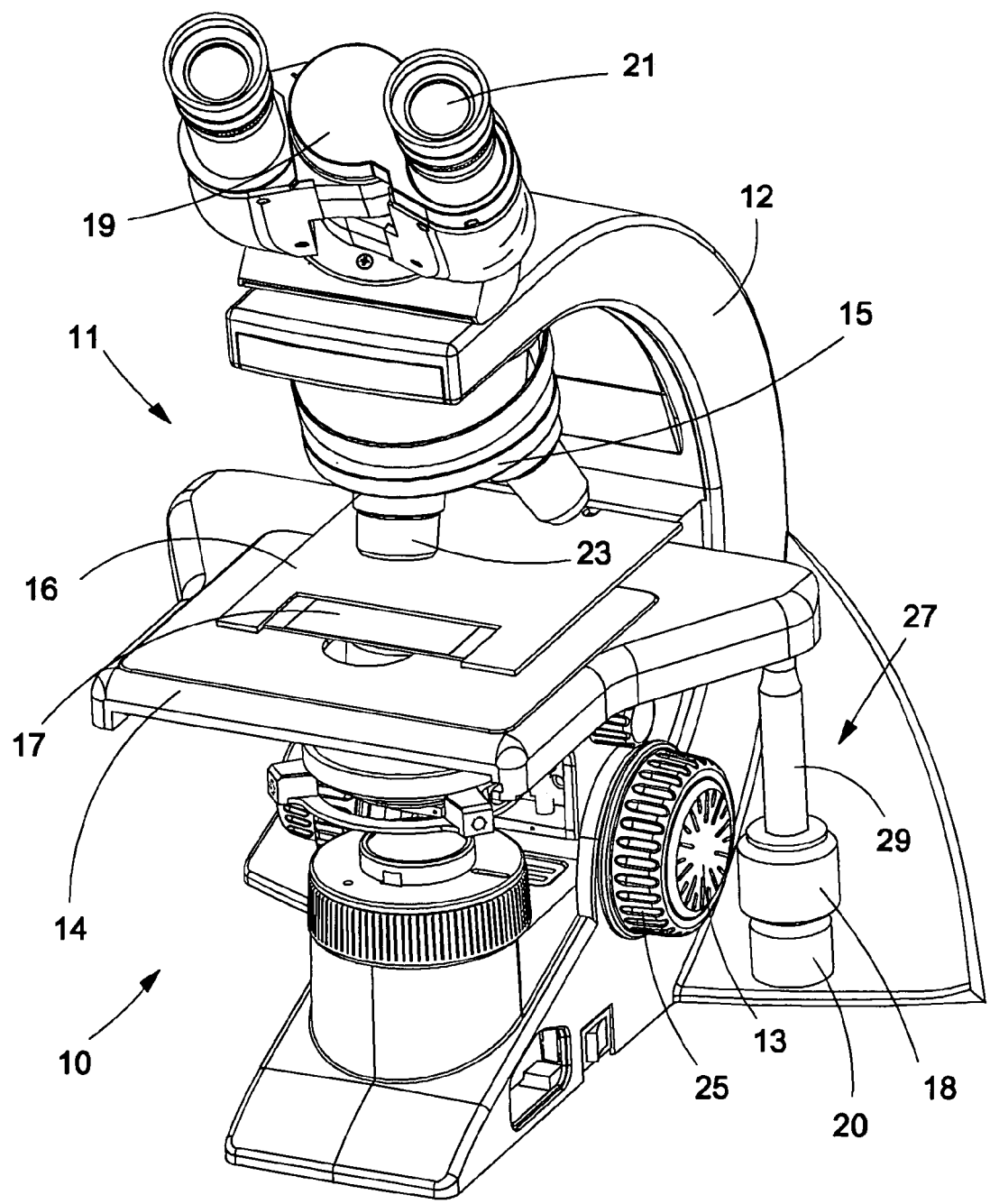
FIG. 1 is a perspective view of a typical compound microscope configured for use with the interchangeable microscope stage drive assembly of the present invention.

FIG. 1 illustrates the general structure of compound microscope 10. The microscope broadly comprises mounting stand 12 to which all the component pieces of the microscope are mounted. In the embodiment shown, the viewing body 19 is binocular, comprising the body and two eyepieces 21. The viewing body is not particularly germane to the invention, which is suitable for use with a microscope configured with any type of viewing body (monocular, binocular, trinocular, video, etc.). Objective lenses 23 are mounted to rotatable turret 15. Microscope 10 further comprises interchangeable microscope stage system 11, which is mounted to stand 12. Interchangeable microscope stage system 11 comprises slide mount 16, stage 14, and drive mechanism 27. Slide mount 16 is incorporated into stage system 11 and enables movement of slide 17 holding the specimen to be viewed. Coarse focus knob 25 and fine focus knob 13 are mounted for rotation to stand 12. Rotating knobs 13 and 25 move stage 14 up and down, further moving slide 17 within the optical path of the microscope, allowing for focus at the specimen.

Figure 2:
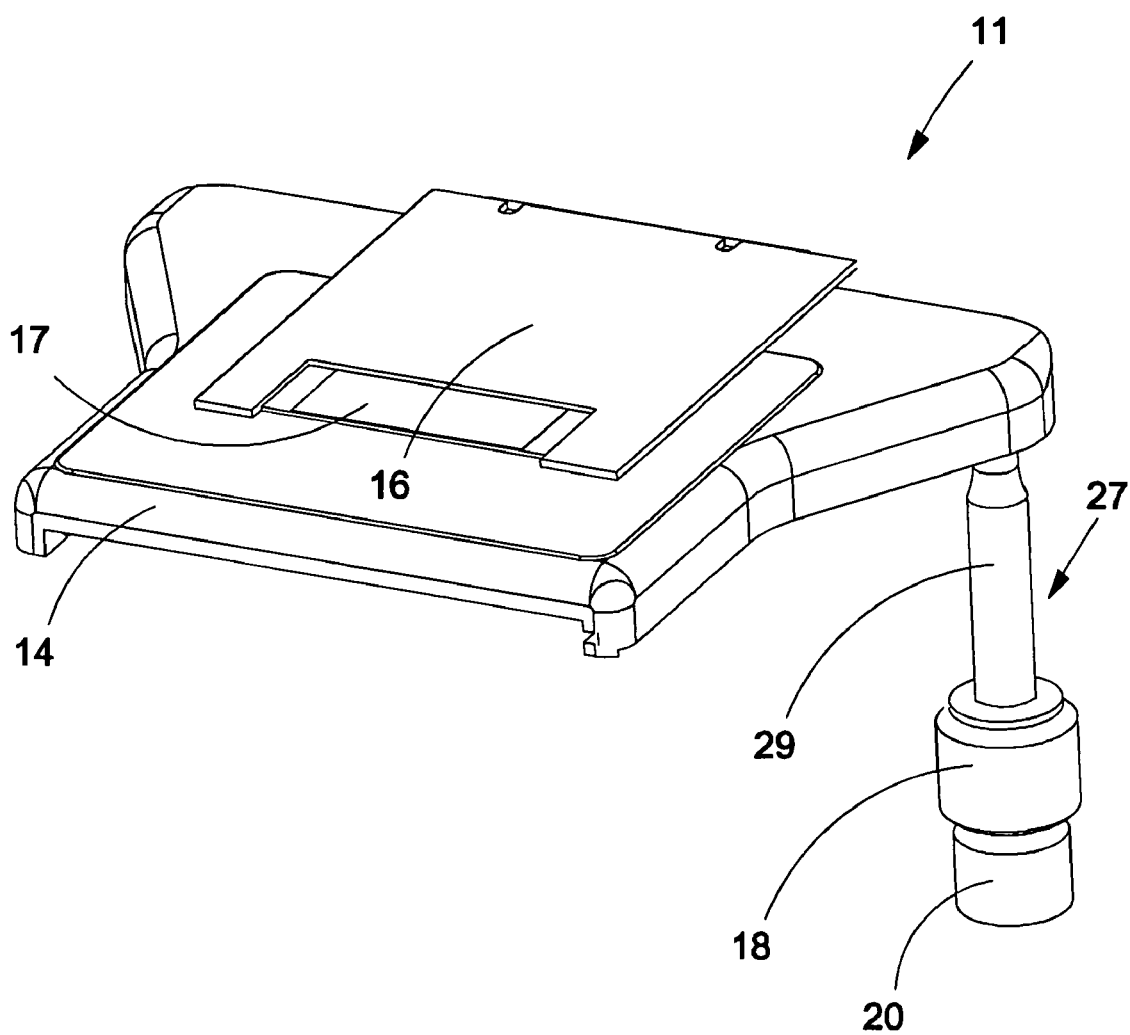
FIG. 2 is a perspective view of the interchangeable microscope stage drive assembly of the present invention.

FIG. 2 is a perspective view of the interchangeable microscope stage drive assembly 11 of the present invention. Stage 14 supports slide 17. Drive 27 comprises drive shaft 29, first stage positioning knob 18, and second stage positioning knob 20. Drive shaft 29 comprises outer drive shaft 22 and inner drive shaft 48 (shown in FIG. 9). Drive 27 is arranged to be detachably secured to the underside of stage 14 in a plurality of locations to accommodate use by a right hand or a left hand. First stage positioning knob 18 is fixedly secured to drive outer drive shaft 22 (shown in FIG. 9), and arranged to effect forward and backward movement of stage 14. Second stage positioning knob 20 is fixedly secured to drive inner drive shaft 48 to effect leftward and rightward movement of slide mount 16, further enabling the movement of slide 17. First stage positioning knob 18 effects movement of stage 14 in a forward and backward direction, whereas second stage positioning knob 20 effects movement of slide mount 16 in a leftward and rightward direction.

Figure 3:
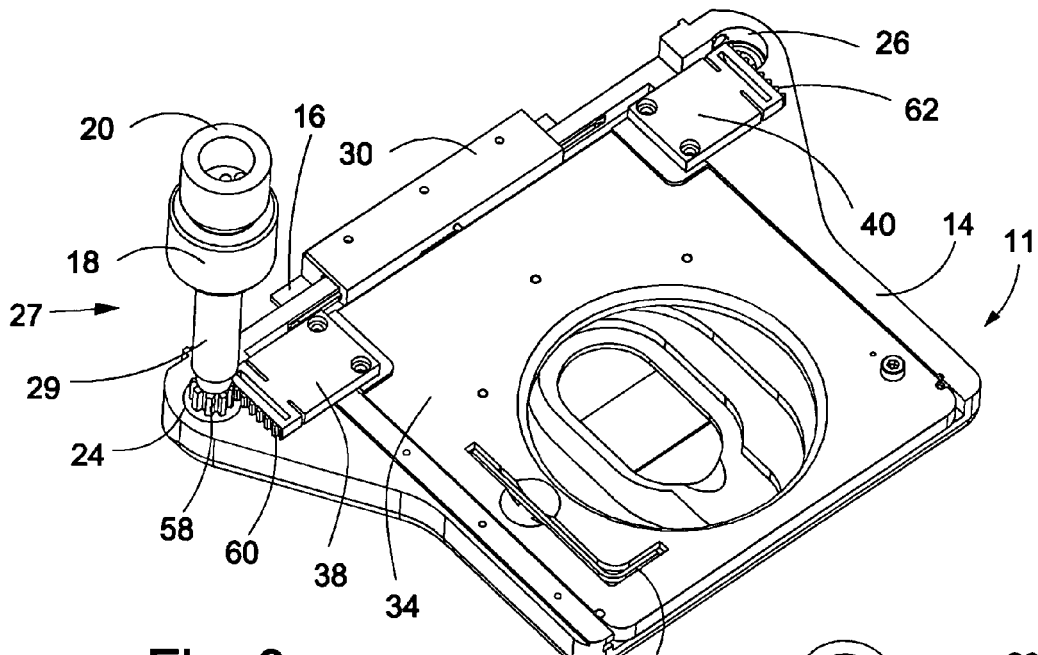
FIG. 3 is a perspective view of the bottom of the interchangeable microscope stage drive assembly of the present invention, having the drive mechanism operatively arranged for right-handed use.

FIG. 3 is a bottom perspective view of a right-handed configuration of interchangeable microscope stage drive assembly 11 of the present invention. In this configuration, drive 27 is detachably secured within mounting hole 24. Stage mounting plate 34 and stage 14 are operatively arranged to permit axially directed relative movement between mounting plate 34 and stage 14. The previously described movement of slide mount 16 is facilitated by the rigid attachment between slide mount 16 and slide mount glide 30. In this configuration, pinion 58 is located at the terminus end of outer drive shaft 22, opposite first stage positioning knob 18. The teeth of pinion 58 engage teeth 60 of rack 38. Rack 38 is affixed to stage mounting plate 34, further enabling axially directed relative movement between mounting plate 34 and stage 14, when rotational force is applied to pinion 58.

Figure 4:
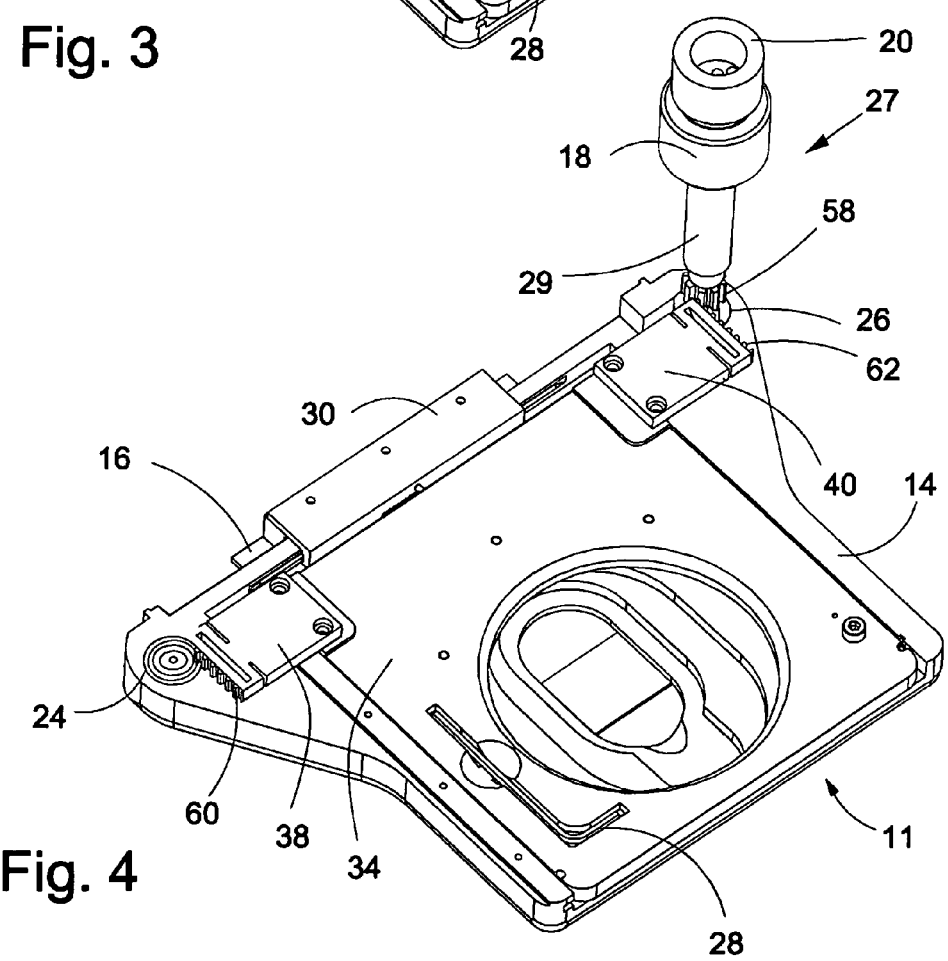
FIG. 4 is a perspective view of the bottom of the interchangeable microscope stage drive assembly of the present invention, having the drive mechanism operatively arranged for left-handed use.

FIG. 4 is a bottom perspective view of a left-handed configuration of interchangeable microscope stage drive assembly 11 of the present invention. In this configuration, drive 27 is detachably secured within mounting hole 26. Stage mounting plate 34 and stage 14 are operatively arranged to permit axially directed relative movement between said mounting plate 34 and stage 14. The previously described movement of slide mount 16 is facilitated by the rigid attachment between said slide mount 16 and slide mount guide 30. In this configuration, pinion 58 is located at the terminus end of outer drive shaft 22 (shown in FIG. 9), opposite first stage positioning knob 18. The teeth of pinion 58 engage teeth 62 of rack 40. Rack 40 is affixed to stage mounting plate 34, further enabling axially directed relative movement between mounting plate 34 and stage 14, when rotational force is applied to pinion 58.

Figure 5:
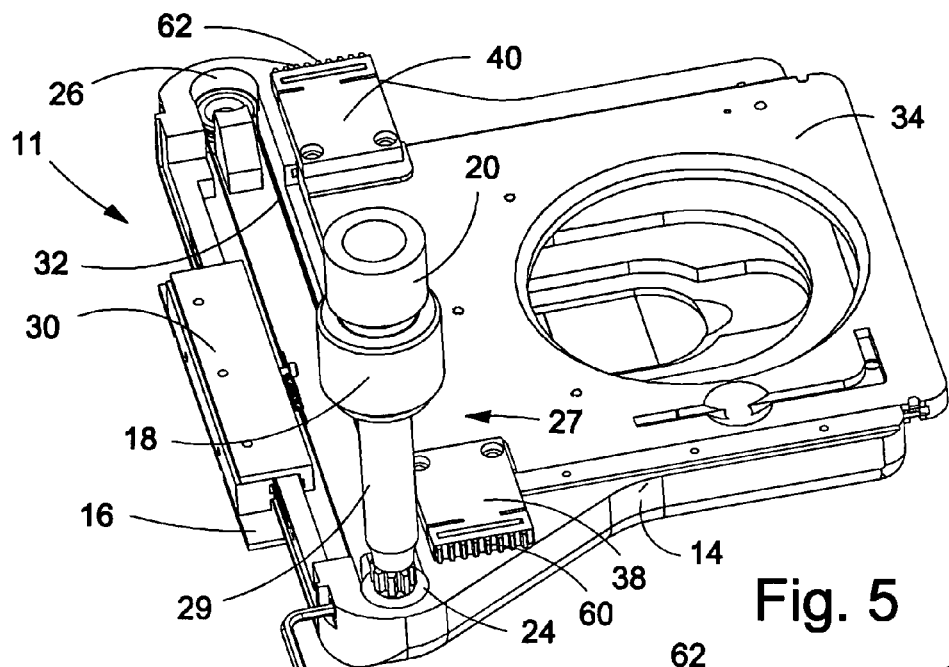
FIG. 5 is a perspective view of the bottom of the interchangeable microscope stage drive assembly of the present invention, depicting a retention method of the drive mechanism in the right-handed operative arrangement.

Drive mechanism 27 is detachably secured to stage 14. This attachment may be made in any number of ways readily apparent to those having ordinary skill in the art. In a preferred embodiment the drive mechanism is detachably secured with a set screw, which set screw engages stage 14 and retaining collar 44 of the drive mechanism. FIG. 5 is a perspective view of the bottom of interchangeable microscope stage drive mechanism 27 of the present invention, depicting the removal of set screw 42 (shown in FIG. 6) from engagement with retaining collar 44 and stage 14. The set screw is shown being removed by wrench 28, preferably an Allen wrench.

Figure 6:
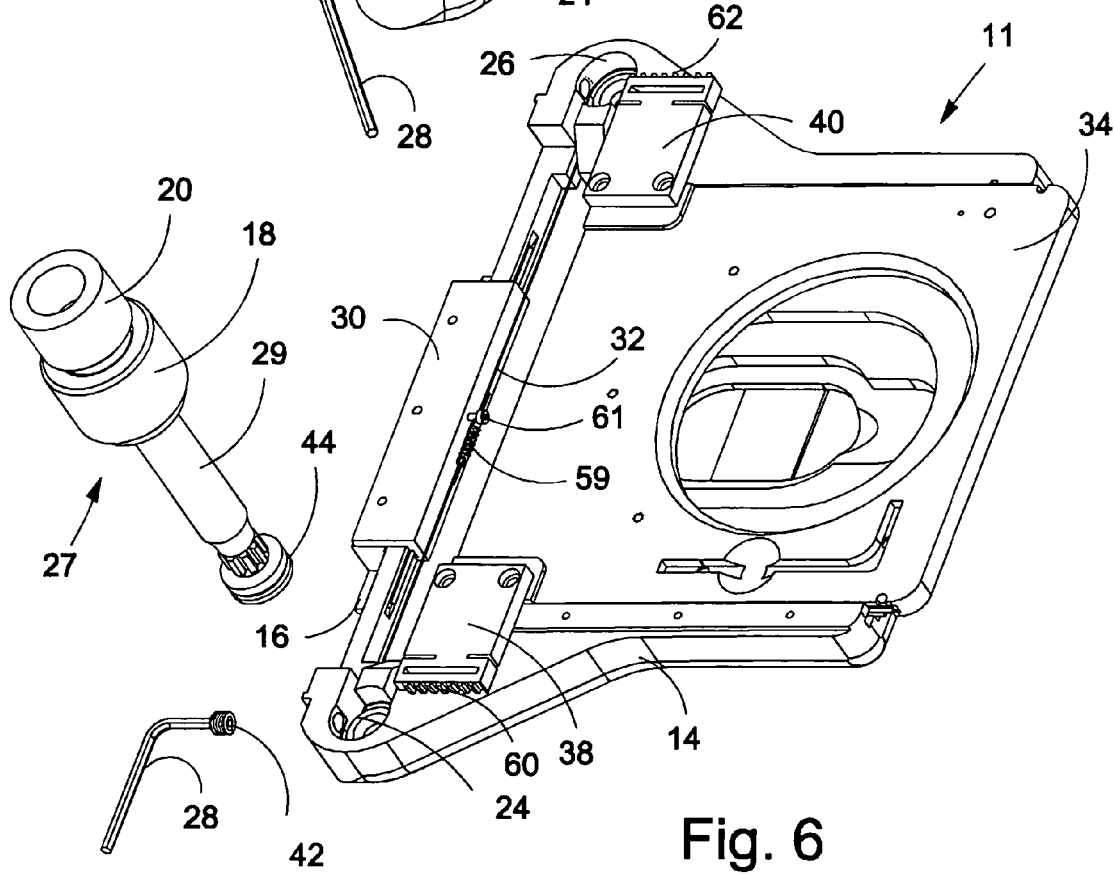
FIG. 6 is a perspective view of the bottom of the interchangeable microscope stage drive assembly of the present invention, depicting the removal of the drive mechanism from an operative arrangement.

FIG. 6 illustrates the drive mechanism after removal from the stage. Set screw 42 is shown as still attached to the wrench 28. Further depicted in this figure are the slide mount driving member 32 and tensioning spring 59, both being attached to screw 61, screw 61 being affixed in slide mount glide 30. Rotation of drive pulley 56 (shown on FIG. 9) imparts a driving force on drive member 32. The force is transmitted and dampened by spring 59, and effects movement of guide 30, by means of the attachment between drive member 32 to glide 30 by screw 61. Movement of glide 30 further effects movement of slide mount 16, wherein the translational movement changes the location within slide 17 (shown in FIG. 1) being observed. Additionally, this embodiment depicts the configuration of the stage mechanism for use by the aforementioned "hand-drive" technique.

Figure 7:
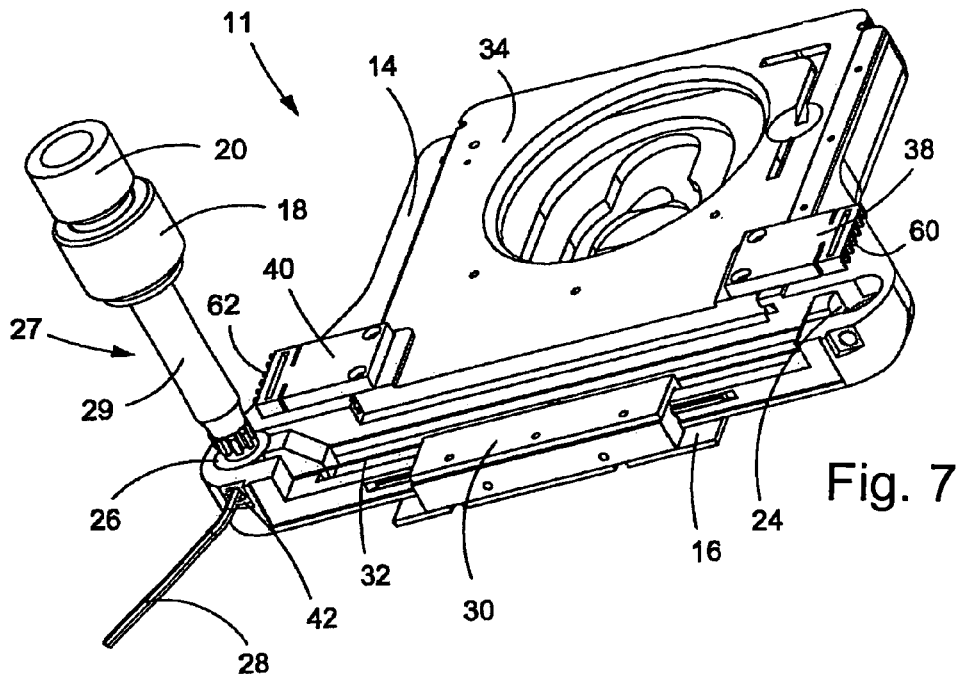
FIG. 7 is a perspective view of the bottom of the interchangeable microscope stage drive assembly of the present invention, depicting a retention method of the drive mechanism in the left-handed operative arrangement.
Figure 7A:
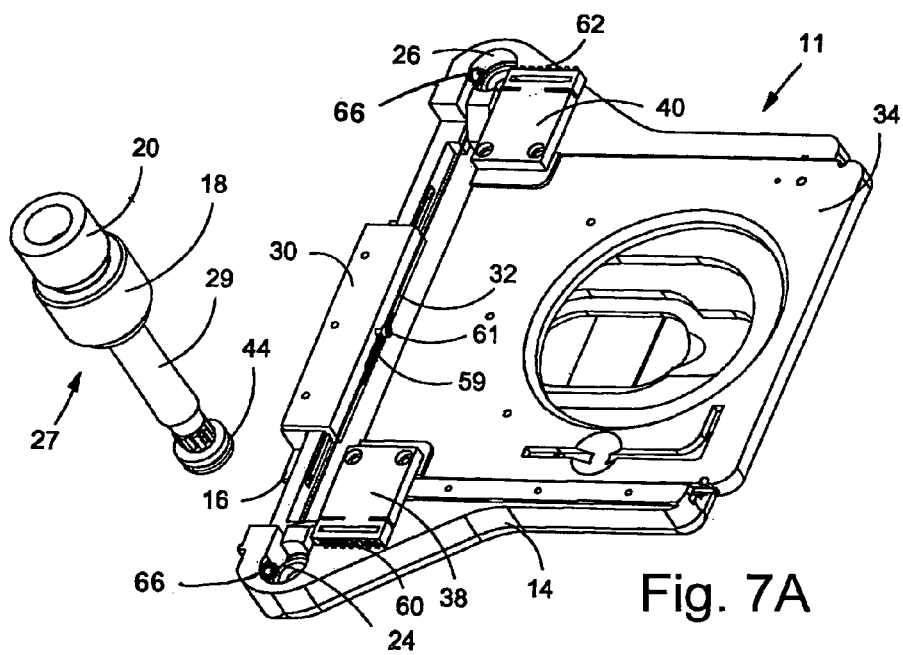
FIG. 7A is a perspective view of the bottom of the interchangeable microscope stage drive assembly of the present invention, depicting an alternative retention method of the drive mechanism.

FIG. 7 is a perspective view of the bottom of the interchangeable microscope stage drive assembly of the present invention, depicting the arrangement for left-handed use of the present invention. In this view, drive mechanism 27 has been reinstalled in mounting hole 26 of stage 14. In this drawing view, Allen wrench 28 is shown tightening set screw 42 for retention of the mechanism. Alternatively, drive mechanism 27 can be detachably secured to the stage by spring-loaded ball bearing 66 as shown in FIG. 7A.

Figure 8:
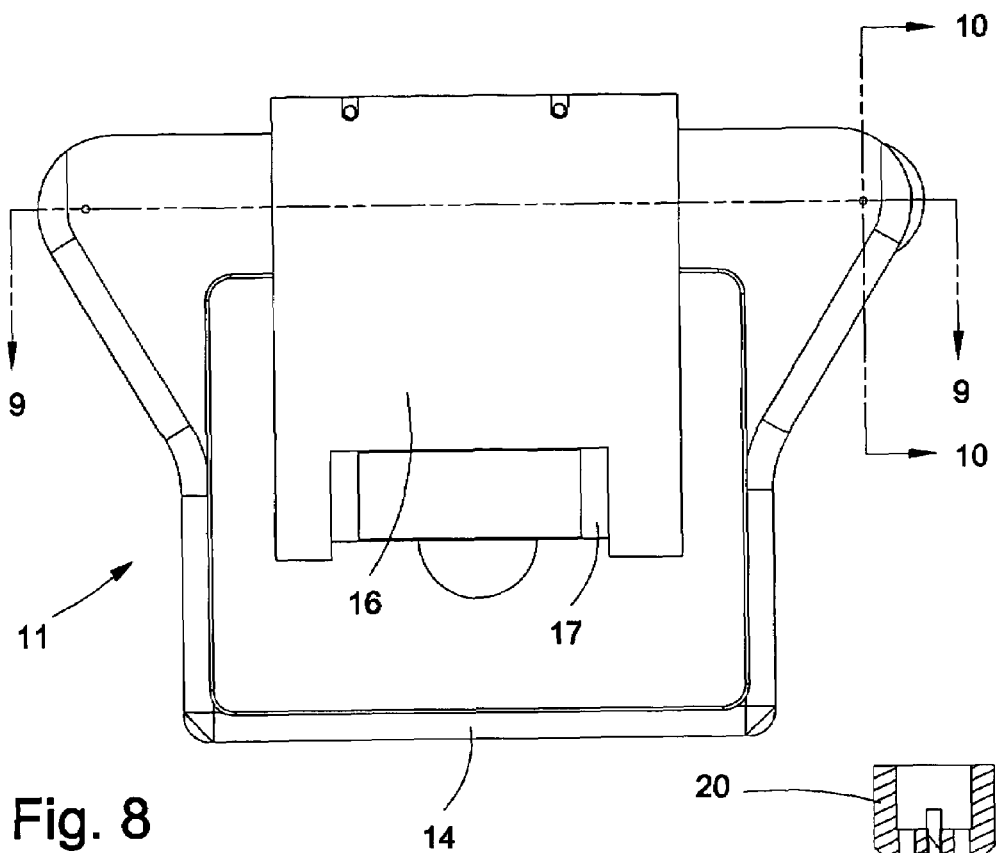
FIG. 8 is a top view of the interchangeable microscope stage drive assembly of the present invention.

FIG. 8 is a top view of the interchangeable microscope stage drive assembly of the present invention.

Figure 9:
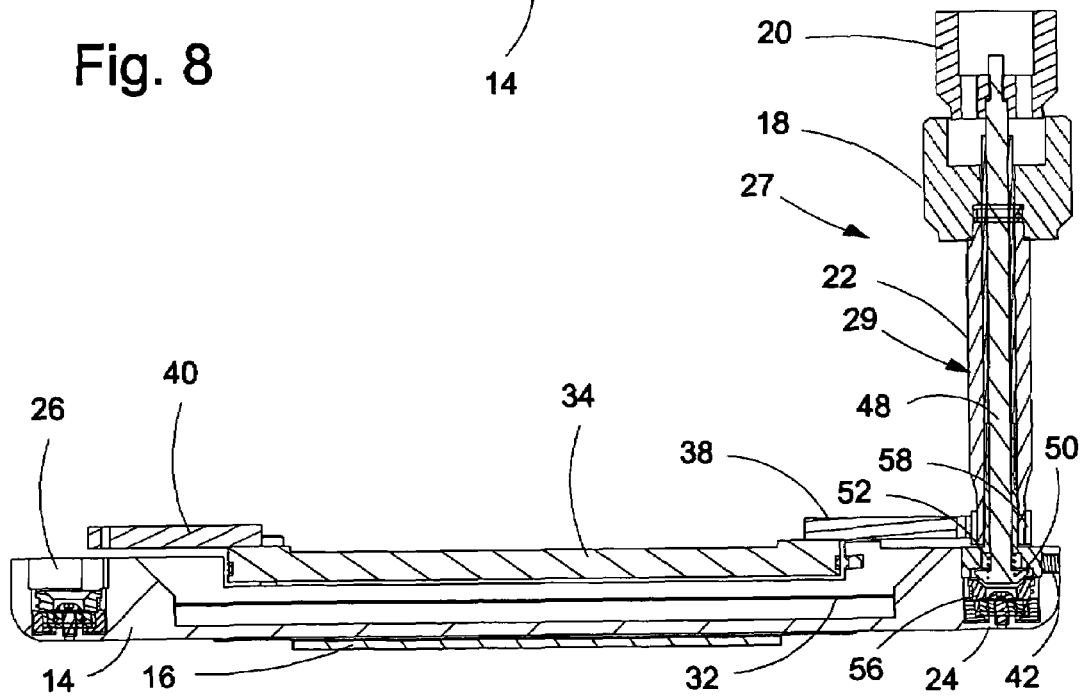
FIG. 9 is a cross-sectional view of the interchangeable microscope stage drive assembly of the present invention, taken generally along line 9-9 of FIG. 8.

FIG. 9 is a cross-sectional view of the interchangeable microscope stage drive assembly of the present invention, taken generally along line 9-9 of FIG. 8. It can be seen in FIG. 9 that outer drive shaft 22 and inner drive shaft 48 are operatively arranged in a co-axial orientation. First stage positioning knob 18 is attached to outer drive shaft 22. Second stage positioning knob 20 is attached to inner drive shaft 48. The terminus end of inner drive shaft 48, opposite second stage positioning knob 20, as depicted in this embodiment, is a frustoconical plunger head 50, although other shapes of the plunger head are possible, and within the scope of the invention as claimed. Spring 52 is biased to provide an engagement force between plunger head 50 and drive pulley 56.

FIG. 10 is a cross-sectional view of the interchangeable microscope stage drive assembly of the present invention, taken generally along line 10-10 of FIG. 8, further depicting the arrangement of stage positioning knobs 18 and 20, and drive shafts 22 and 48, with set screw 42. In this view, plunger head 50 has no engagement force applied to the plunger head, therefore plunger head 50 and drive pulley 56 are not matingly contacted, further, no driving force can be applied to drive member 32 in this configuration.

FIG. 11 is a magnified view of the interchangeable microscope stage drive assembly shown in the encircled region of FIG. 10. This drawing further depicts the use of retaining collar 44 with set screw 42 to retain drive shafts 22 and 48 in stage 14. Collar 44 comprises annular ring 45, wherein screw 42 is located, detachably securing collar 44 within stage 14.

Figures 12, 13:
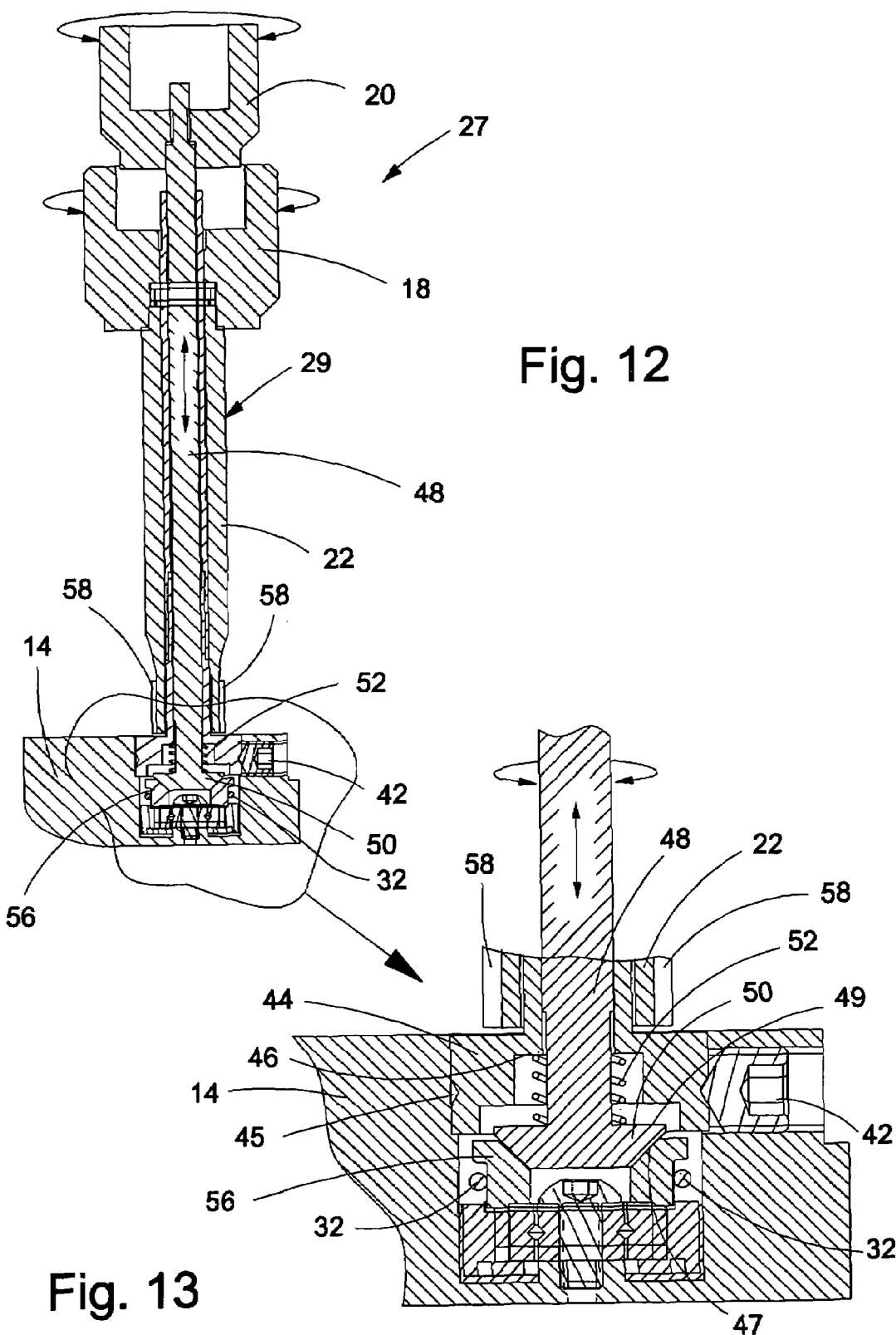
FIG. 12 is a cross-sectional view of the interchangeable microscope stage drive assembly of the present invention, taken generally along line 10-10 of FIG. 8, depicting degrees of freedom of movement of the stage drive mechanism.
FIG. 13 is a magnified view of the encircled region of the invention shown in FIG. 12.

FIG. 12 is a view of the drive assembly, similar to FIG. 10, except illustrating degrees of freedom of stage positioning knobs 18 and 20, and drive shaft 48, and showing the mating engagement between plunger head 50 and drive pulley 56. Both stage positioning knobs 18 and 20 are operatively arranged for rotational movement. Inner drive shaft 48 is operatively arranged for rotational and axially directed movement. Forward movement of stage 14 is effected by clockwise rotation of first stage positioning knob 18. Rightward movement of slide mount 16 is effected by clockwise rotation of second stage positioning knob 20.

FIG. 13 is a magnified view of the interchangeable microscope stage drive assembly shown in the encircled region of FIG. 12. In this view, spring 52 contacts inner surface 46 of retaining collar 44 and top surface 49 of plunger head 50. The contact as described biases plunger head 50 into engagement with counter bore 47 within drive pulley 56. In this embodiment, plunger head 50 and counter bore 47 matingly engage, wherein the shape of plunger head 50 and counter bore 47 is frustoconical.

Figure 14:
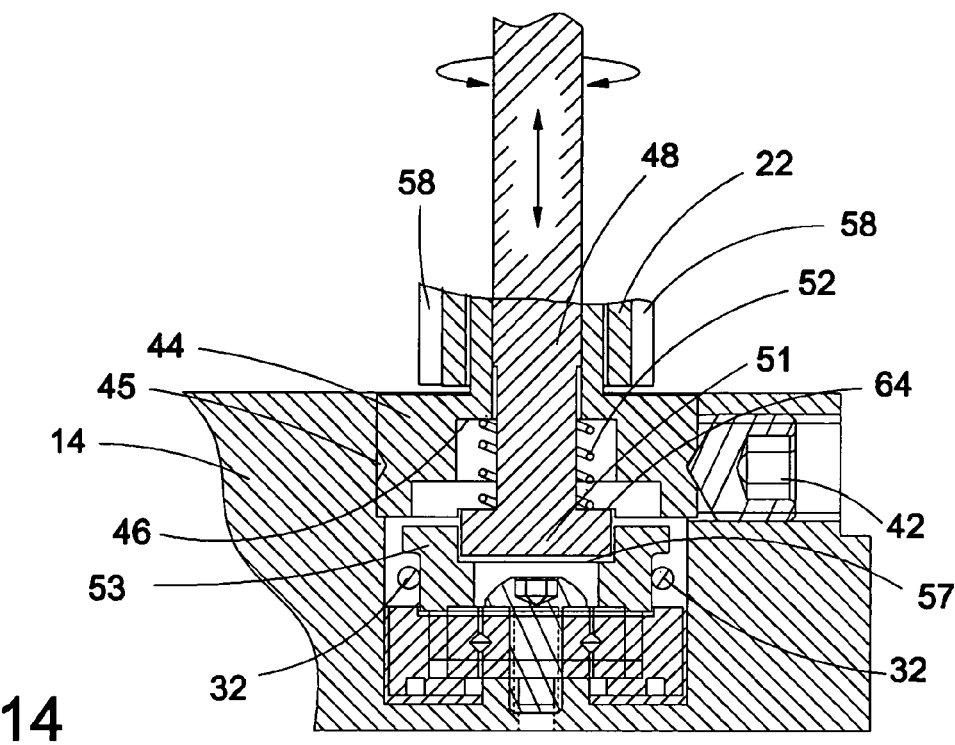
FIG. 14 is a magnified view of the interchangeable microscope stage drive assembly of the present invention, similar to FIG. 13, depicting a second embodiment of the plunger head and drive pulley; and, FIG. 15 is a magnified view of the interchangeable microscope stage drive assembly of the present invention, similar to FIG. 13, depicting a third embodiment of the plunger head and drive pulley.

FIG. 14 is a magnified view of the interchangeable microscope stage drive assembly, similar to FIG. 13, except an additional embodiment of plunger head 51 and counter bore 57 within drive pulley 53. In this embodiment, spring 52 contacts inner surface 46 of retaining collar 44 and top surface 64 of plunger head 51. The contact as described biases plunger head 51 into engagement with counter bore 57 within drive pulley 53. As depicted by the drawing, plunger head 51 and counter bore 57 matingly engage, wherein the shape of plunger head 51 and counter bore 57 is cylindrical.

Figure 15:
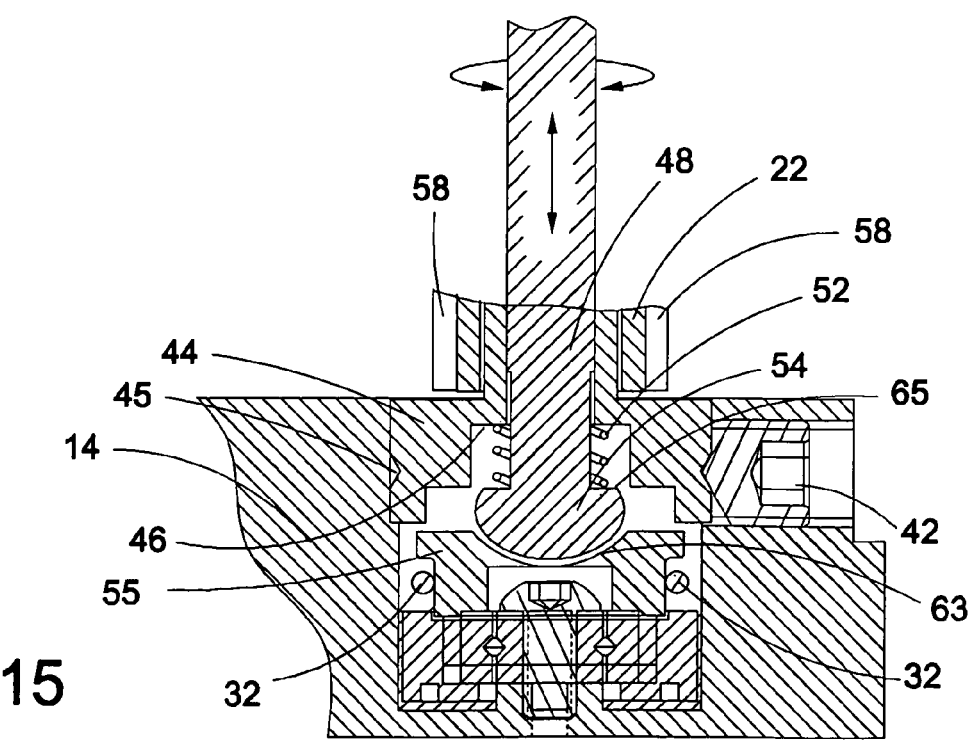

FIG. 15 is a magnified view of the interchangeable microscope stage drive assembly, similar to FIG. 13, except an additional embodiment of plunger head 54 and counter bore 63 within drive pulley 55. In this embodiment, spring 52 contacts inner surface 46 of retaining collar 44 and top surface 65 of plunger head 54. The contact as described biases plunger head 54 into engagement with counter bore 63 within drive pulley 55. As depicted by the drawing, plunger head 54 and counter bore 63 matingly engage, wherein the shape of plunger head 54 and counter bore 63 is curved.

Thus, it is seen that the objects of the present invention are efficiently obtained, although modifications and changes to the invention should be readily apparent to those having ordinary skill in the art, which modifications are intended to be within the spirit and scope of the invention as claimed.

What is claimed:

1. A microscope stage assembly, comprising:
a stage having a left side and a right side;
a microscope stage drive mechanism having an end shaped to be detachably secured to the underside of said stage on the left or the right side of said stage;
a first engagement means for said microscope stage drive mechanism positioned at a first hole at a first location on the left side of said stage, wherein said end of said drive mechanism is receivable into said first hole to detachably secure said drive mechanism at said first location of said stage; and,
a second engagement means for said microscope stage drive mechanism positioned at a second hole at a second location on the right side of said stage, wherein said end of said drive mechanism is receivable into said second hole to detachably secure said drive mechanism at said second location of said stage.

2. The microscope stage assembly recited in claim 1 wherein said first location further comprises a rack operatively arranged to engage the microscope stage drive mechanism.

3. The microscope stage assembly recited in claim 1 wherein said first location further comprising a belt and pulley operatively arranged to engage the microscope stage drive mechanism.

4. The microscope stage assembly recited in claim 1 wherein said first engagement means further comprising a set screw to detachably secure said stage drive mechanism to said stage.

5. The microscope stage assembly recited in claim 1 wherein said first engagement means further comprising a spring-loaded ball bearing to detachably secure said stage drive mechanism to said stage.

6. The microscope stage assembly recited in claim 1 wherein said second location further comprises a rack operatively arranged to engage the microscope stage drive mechanism.

7. The microscope stage assembly recited in claim 1 wherein said second location further comprising a belt and pulley operatively arranged to engage the microscope stage drive mechanism.

8. The microscope stage assembly recited in claim 1 wherein said second engagement means further comprising a set screw to detachably secure said stage drive mechanism to said stage.

9. The microscope stage assembly recited in claim 1 wherein said second engagement means further comprising a spring-loaded ball bearing to detachably secure said stage drive mechanism to said stage.

10. The microscope stage assembly recited in claim 1 in combination with a microscope.

11. The microscope stage assembly recited in claim 1 in combination with a microscope stage drive mechanism.

12. An interchangeable microscope stage drive assembly, comprising:
   a microscope stage having a left side, a right side and a hole on each of the left and the right sides of said stage;
   a stage drive mechanism detachably securable to said microscope stage to the left or right side of said stage, wherein said drive mechanism is detachably secured to said stage by inserting an end of said drive mechanism in one of said holes at said right or left side of said stage; and,
   a spring-loaded ball bearing to detachably secure said stage drive mechanism to said stage.

* * * * *